Sept. 19, 1950 P. G. GILBERT 2,522,710
WHEEL
Filed Sept. 7, 1948

INVENTOR
PHILO G. GILBERT

ATTORNEY

Patented Sept. 19, 1950

2,522,710

UNITED STATES PATENT OFFICE 2,522,710

WHEEL

Philo G. Gilbert, Seattle, Wash.

Application September 7, 1948, Serial No. 48,068

4 Claims. (Cl. 152—82)

This invention relates generally to wheels and pratically to wheels for supporting vehicles.

The main object of this invention is to provide an improved form of wheel, whereby the supported load exerts a turning movement on the wheel supporting the load, which wheel constitutes a continuous or circular arch which has, uniformly distributed around said wheel, all of the stresses imposed upon the wheel and prevents these stresses from being abruptly transferred to the axle upon which the wheel is mounted.

The second object is to lessen the shocks on the axle, wheel and tires, and reduce crystallization of the metallic members, thereby adding to the life of the vehicle and lessening its cost of operation, as well as increasing the safety factor, thereof, by the reduction of breakage.

The third object is to construct a wheel whose working parts tend to overcome the inertia of the load and which require no lubrication for working parts and, in which, travel over rough or bumpy roads will be expedited.

I accomplish these and other objects in the manner set forth in the accompanying drawing, in which Fig. 1 is a side elevation of my wheel, with a portion of one of the side disks removed.

Like numbers of reference refer to the same or similar parts throughout the several views.

Figure 1:
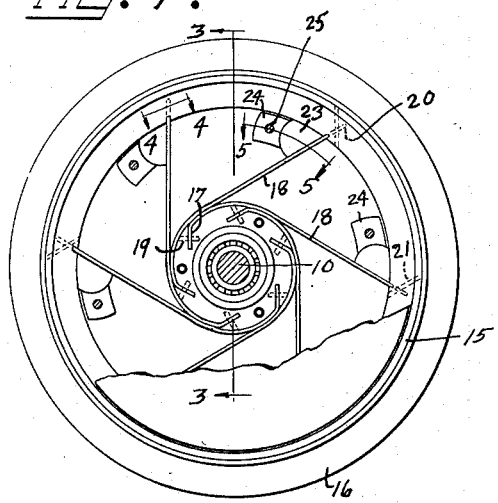
Figure 2:
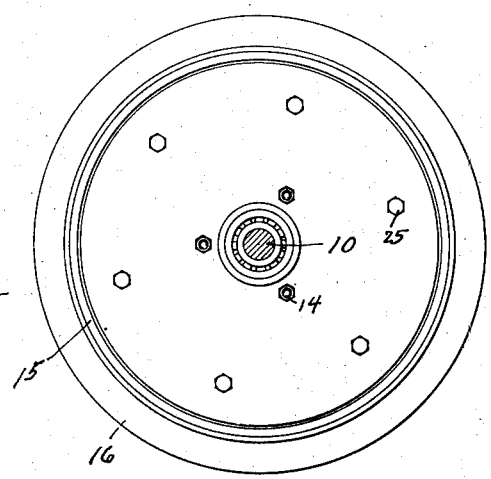
Fig. 2 is a side elevation of the wheel with the cover plate in place.
Figure 3:
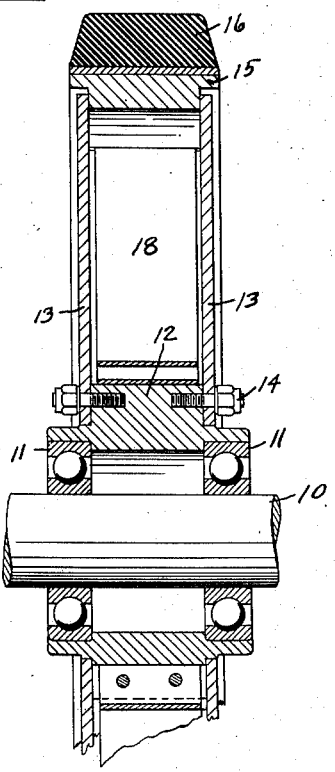
Fig. 3 is an enlarged section taken along the line 3—3 in Fig. 1.
Figure 4:
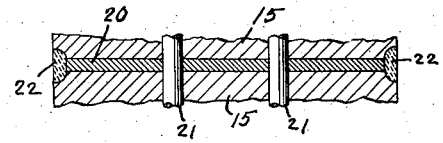
Fig. 4 is a section taken along the line 4—4 in Fig. 1.
Figure 5:
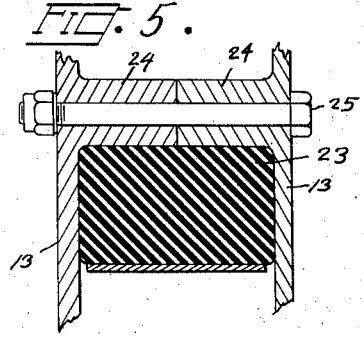
Fig. 5 is a section taken along the line 5—5 in Fig. 1.

Referring in detail to the drawing, there is shown a shaft or axle 10, upon whose anti-friction bearings 11 is mounted a hub 12, against which are secured the disk side plates 13 by means of the bolts 14.

Surrounding the hub 12 and movable between the plates 13 is a wheel rim 15, upon which is mounted a tire 16.

The hub 12 is slotted to receive the ends 17 of the resilient straps 18 which may be of metal or other suitable material of high tensile strength but not necessarily in spring form. The ends 17 are secured to the hub 12 by means of the pins 19.

The ends 20 of the straps 18 extend into slots formed in the rim 15 in a manner that the strap 18 is tangential to the hub 12. The end 20 is secured to the rim 15 by means of the pins 21 and the welds 22.

In the acute angle formed between each strap end 20 on the rim 15 is placed a rubber block 23 which is held in compression by means of a lug 24 which is integral with the plates 13.

The plates 13 are held together by means of the bolts 25 which pass through the lugs 24 and serve as spacers for the plates 13.

It follows that, when a load is placed upon the axle 10, it is transferred through the straps 18 which are always in tension, due to the compression of the rubber blocks 23 and this compression must be sufficient to hold the axis of the shaft 10 along the axis of the wheel rim 15. It then follows that any load or driving torque imposed on the wheel rim 15 would be transferred by uniform application of power throughout its circumference. It also follows that this wheel will absorb much of the road shock imposed thereon, as well as the shocks of starting and braking.

If the wheel is to be used as a driving member, that is, if the tire 16 is to revolve with the shaft 10 at all times, then the anti-fraction bearings 11 are omitted and the hub 12 is keyed directly to the shaft 10.

Attention is drawn to my co-pending application 532,062, filed April 21, 1944, now Patent No. 2,431,802, December 2, 1947, over which the device described herein is an improvement.

I claim:

1. A wheel having in combination an axle, a hub mounted on said axle, a pair of spaced inner disks secured to said hub, a rim around said disks having a portion thereof guiding between same, a plurality of tangential spokes secured in tension to said hub and anchored to said rim and a rubber block supported by said disks, held in compression within the acute angle formed between each strap and the adjacent portion of the rim.

2. A wheel having in combination an axle, a hub mounted on said axle, a pair of spaced disks secured to said hub, a wheel rim having an inturned portion guiding between the disks and capable of a limited eccentric movement therebetween, tangential straps anchored to said hub on their inner ends and to said wheel rim on their outer ends, rubber compression blocks disposed at the junction of said straps and rim adapted to hold said straps in tension.

3. The wheel, as described in claim 2, characterized by having the disks held in spaced relationship by means of lugs which constitute backings for the rubber blocks.

4. A wheel of the class described having in combination an axle, a pair of anti-friction bearings mounted on said axle, a cylindrical hub supported by said bearings, a pair of disks rigidly attached to said hub and held in spaced relation thereto, a rim surrounding said disks, having a portion thereof extending between said disks and capable of limited eccentric movement thereto, a plurality of straps wound upon said hub and anchored thereto and extending tangentially therefrom, the extending ends of said straps being anchored to said rim, each of said straps having a rubber backing at its junction with said rim and means for holding said backing in compression for the purpose of maintaining a tension on said straps.

PHILO G. GILBERT.

REFERENCES CITED

The following references are of record in the file of this patent:

UNITED STATES PATENTS

| Number | Name | Date |
|---|---|---|
| 289,294 | McLaren | Nov. 27, 1883 |
| 1,012,796 | Bartle | Dec. 26, 1911 |
| 1,286,761 | Payne | Dec. 3, 1918 |